US010705888B2

(12) United States Patent
Palka et al.

(10) Patent No.: US 10,705,888 B2
(45) Date of Patent: Jul. 7, 2020

(54) METHOD AND SYSTEM FOR PROVIDING ENHANCED EXECUTABLE APPLICATIONS

(71) Applicant: Secude AG, Lucerne (CH)

(72) Inventors: Robert Tadeusz Palka, Rotkreuz (CH); Philipp Meier, Rothenburg (CH); Senthil Ratnam, Chennai (IN); Rajagopalan Sundar, Chennai (IN)

(73) Assignee: Secude AG, Lucerne (CH)

( * ) Notice: Subject to any disclaimer, the term of this patent is extended or adjusted under 35 U.S.C. 154(b) by 0 days.

(21) Appl. No.: 16/502,537

(22) Filed: Jul. 3, 2019

(65) Prior Publication Data

US 2020/0012539 A1 Jan. 9, 2020

Related U.S. Application Data

(60) Provisional application No. 62/694,276, filed on Jul. 5, 2018.

(51) Int. Cl.
*G06F 9/54* (2006.01)
*G06F 21/31* (2013.01)
*G06F 21/62* (2013.01)

(52) U.S. Cl.
CPC .............. *G06F 9/541* (2013.01); *G06F 21/31* (2013.01); *G06F 21/6209* (2013.01)

(58) Field of Classification Search
CPC ......... G06F 21/316; G06F 9/541; G06F 21/31
See application file for complete search history.

(56) References Cited

U.S. PATENT DOCUMENTS

| 2002/0144153 A1* | 10/2002 | LeVine | G06F 21/10 726/33 |
| 2005/0270294 A1* | 12/2005 | Le Tuan | G06T 13/00 345/473 |
| 2007/0050770 A1* | 3/2007 | Geisinger | G06F 9/45537 718/100 |
| 2013/0007693 A1* | 1/2013 | Bliss | G06F 8/63 717/101 |
| 2016/0301738 A1* | 10/2016 | Gentile | G06F 21/10 |
| 2016/0301739 A1* | 10/2016 | Thompson | H04L 67/2804 |

OTHER PUBLICATIONS

European Search Report dated Dec. 11, 2019 issued in corresponding European Application No. 19184638.5-1224 / 3591555.
Collin Mulliner et al.: "PatchDroid", 20131209; 1077952576-1077952576, Dec. 9, 2013, pp. 259-268, XP058036012.
Willem De Groef et al.: "NodeSentry", Proceedings of the 30th Annual Computer Security Applications Conference, ACM, Dec. 8, 2014 (Dec. 8, 2014), pp. 446-455, XP058062761.
Zhauniarovich Yury et al.: "Moses: Supporting and Enforcing Security Profiles on Smartphones", IEEE Transactions on Dependable and Scure Computing, NY, NY, vol. 11, No. 3, May 1, 2014, pp. 211-223, XP011547822. ISSN: 1545-5971.
Graham Williamson et al.: "Secure Information Sharing", KuppingerCole Report from KuppingerCole Analysts, Jul. 1, 2015 (Jul. 1, 2015), pp. 1-57, XP055646948.

* cited by examiner

*Primary Examiner* — Tuan C Dao
(74) *Attorney, Agent, or Firm* — Amster, Rothstein & Ebenstein LLP

(57) ABSTRACT

The present invention generally relates to a system and method to enhance functionality of an executable application in a computer system in which application program interfaces associated with one or more executable applications are hooked to modified application program interfaces to provide increased functionality.

16 Claims, 13 Drawing Sheets

METHOD AND SYSTEM FOR PROVIDING ENHANCED EXECUTABLE APPLICATIONS

CROSS-REFERENCE TO RELATED APPLICATIONS

The present application claims benefit of and priority to U.S. Provisional Patent Application No. 62/694,276 entitled METHOD AND SYSTEM FOR PROVIDING ENHANCED EXECUTABLE APPLICATIONS filed Jul. 5, 2018, the entire content of which is hereby incorporated by reference herein.

BACKGROUND

Field of the Disclosure

The present disclosure relates to application enhancement and interprocess communication. In particular, the method and system of the present application allow for enhancement of executable applications, for example, improving application data processing capabilities to provide for encrypting of file formats. While this is a specific example, the method and system of the present disclosure is not limited to use in providing for encrypted files, but may be used to provide a variety of enhanced features.

Related Art

Executable applications are commonly used in contemporary computer systems to provide a variety of functionality. One drawback of such applications, however, is that they typically only exist in compiled form. As a result, the code for such applications is generally not viewable or modifiable. Thus, the functionality of these applications generally cannot be modified or enhanced. This lack of transparency limits the usefulness of these applications since it prevents modification to extend the capabilities of such applications. That is, there is a technical problem presented by conventional computer systems in that executable applications are inaccessible which prevents enhancement of their functionality. For example, in many environments where security is a concern, it is desirable to encrypt data before transmission or storage, however, the lack of transparency provided by executable applications prevents the insertion of simple modifications that would allow this additional functionality.

SUMMARY

As noted above, the use of executable applications presents a technical problem in that these applications only exist on a computer system in compiled form such that their code is not viewable or modifiable. As a result, users are generally not able to modify or enhance these applications such that their usefulness is limited, which also reduces the effectiveness of the computer systems using the applications. There are a variety of enhancements that would be desirable such as supporting non-standard file types, new data exchange formats and network protocols, to name a few.

It is an object of the present disclosure to provide a method and system of enhancing the functionality of one or more executable applications on a computer system to solve the technical problem described above. In embodiments, the method may include providing a listener process to make hooks into application functions of a target applications to implement additional or enhanced functionality. In embodiments, this may be accomplished by leveraging interprocess communication (IPC) mechanisms and creating alternate user sessions.

In embodiments, the method unifies an interface for extending interprocess communication to include the ability to execute customized processes in injected target applications. In embodiments, the method and system of the present disclosure allows for binding a dynamic library implemented by a third-party vendor implemented IPC Extension Ability (IPC EA) interface to selected executed processes to enhance their function.

A method of enhancing functionality of an executable application in a computer system, wherein the computer system includes at least one processor and one or more memory storage elements operatively connected to the at least one processor, in accordance with an embodiment of the present disclosure includes: (a) storing, in the one or more memory storage elements, installation information including: (i) a list of a plurality of target applications; and (ii) configuration information related to each target application of the plurality of target applications; (b) monitoring, by an administrator portion of the at least one processor, operation of the computer system to identify activation of at least one target application of the plurality of target applications by the at least one processor; (c) modifying, by the administrator portion of the at least one processor, at least one configuration file associated with the target application to load at least one alternate library associated with the target application; (d) initiating, by the administrator portion of the at least one processor, at least one application handler associated with the at least target application from the alternate library; (e) identifying, by the administrator portion of the at least one processor using the application handler, at least one application program interface associated with at least one enhanced function to be provided to the target application; (f) modifying, by the administrator portion of the at least one processor using the application handler utility, a call to the at least one application program interface to include an alternate address associated with a first modified application program interface; (g) calling, by the administrator portion of the at least one processor using the application handler, the first modified application program interface; (h) processing, by the at least one processor, the at least one file based with the at least one target application using the modified application program interface to provide additional functionality not available without use of the modified application program interface; wherein the processing includes at least one of encrypting and decrypting data in the at least one file on the fly without using a temporary file; and (i) returning, by the administrator portion of the at least one processor using the application handler, operation of the target application to the at least one application program interface to provide for conventional functionality of the target application.

In embodiments, the configuration information includes API information identifying at least one application program interface associated with each target application.

In embodiments, the modified library includes at least one modified application program interface associated with each target application.

In embodiments, the modified library includes at least a second modified application program interface associated with each target application, and the application handler calls the second modified application program interface associated with the at least one target application and the at least one file is processed based on the second modified application program interface.

In embodiments, the at least one of decrypting and encrypting data in the at least one file further comprises steps of: (1) determining that the data is one of encrypted and decrypted; (2) in the case where the data is one of encrypted and decrypted, further comprising, determining that authorization is required to encrypt or decrypt the data; (3) authorizing at least one user based on identification information associated with the user, (4) after authorizing the user, encrypting or decrypting the data in the at least one file; (5) storing the at least one file.

In embodiments, in the case where the data is not encrypted or decrypted, the method proceed to step (i).

In embodiments, step (e) includes identifying more than one application program interface associated with the target application and step (f) includes modifying calls to the more than one application program interfaces.

In embodiments, step (g) includes calling the more than one modified application program utilities and step (h) includes processing the at least one file based on the more than one modified application program utilities.

A system of enhancing functionality of an application in a computer system in accordance with an embodiment of the present disclosure includes: (a) at least one processor; and (b) one or more storage units operatively connected to the processor, wherein the one or more storage units include compiled computer executable code that is readable by the at least one processor to execute one or more executable applications using the computer system and computer executable code, wherein when executed by the at least one processor results in the processor performing the following steps: (i) storing, in the one or more memory storage elements, installation information including: (1) a list of a plurality of target applications; and (2) configuration information related to each target application of the plurality of target applications; (ii) monitoring, by an administrator portion of the at least one processor, operation of the computer system to identify activation of at least one target application of the plurality of target applications by the at least one processor; (iii) modifying, by the administrator portion of the at least one processor, at least one configuration file associated with the target application to load at least one alternate library associated with the target application; (iv) initiating, by the administrator portion of the at least one processor, at least one application handler associated with the at least target application from the alternate library; (v) identifying, by the administrator portion of the at least one processor using the application handler, at least one application program interface associated with the at least one enhanced function to be provided to the target application; (vi) modifying, by the administrator portion of the at least one processor using the application handler utility, a call to the at least one application program interface to include an alternate address associated with a first modified application program interface; (vii) calling, by the administrator portion of the at least one processor using the application handler, the first modified application program interface using the alternate address; (viii) processing, by the administrator portion of the at least one processor, at least one file based on the modified application program interface to provide additional functionality not available without use of the modified application program interface; wherein the processing includes at least one or encrypting and decrypting data in the at least one file on the fly without using a temporary file; (ix) returning, by the administrator portion of the at least one processor using the application handler, operation of the target application to the at least one application program interface to provide for conventional functionality of the target application.

In embodiments, the configuration information includes API information identifying at least one application program interface associated with each target application.

In embodiments, the modified library includes at least one modified application program interface associated with each target application.

In embodiments, the modified library includes at least a second modified application program interface associated with each target application, and the application handler calls the second modified application program interface associated with the at least one target application and the at least one file is processed based on the second modified application program interface.

In embodiments, the at least one of decrypting and encrypting data in the at least one file further comprises steps of: (1) determining that the data is one of encrypted and decrypted; (2) in the case where the data is one of encrypted and decrypted, further comprising, determining that authorization is required to encrypt or decrypt the data; (3) authorizing at least one user based on identification information associated with the user, (4) after authorizing the user, encrypting or decrypting the data in the at least one file; (5) storing the at least one file.

In embodiments, in the case where the data is not encrypted or decrypted, the method proceed to step (b)(ix).

In embodiments, step (b)(v) includes identifying more than one application program interface associated with the target application and step (b)(vi) includes modifying calls to the more than one application program interfaces.

In embodiments, step (b)(vii) includes calling the more than one modified application program interfaces and step (b)(viii) includes processing the at least one file based on the more than one modified application program interfaces.

A method of enhancing functionality of an executable application on a computer system where the computer system includes at least one processor and one or more storage elements, where the one or more storage elements include compiled computer executable code associated with a plurality of executable applications, in accordance with an embodiment of the present disclosure, includes steps of: (a) storing, in the one or more memory storage elements, installation information including: (i) a list of a plurality of target application; (ii) configuration information related to each target application of the plurality of target applications; (iii) user information related to a plurality of users of the computer system including user rights information; and (iv) desired user information associated with a plurality of desired user profiles including enhanced user rights information; (b) monitoring, by an administrator portion of the at least one processor, operation of the computer system to identify activation of at least one target application of the plurality of target applications by the at least one processor and a user associated with the activation; (c) initiating, by the administrator portion of the at least one processor, a desired user session based on the desired user information to access the at least one target application; (d) linking, by the administrator portion of the at least one processor, the at least one target application to an alternate library associated with the at least one target application via the desired user session and the enhanced user rights; (e) accessing, by the administrator portion of the at least one processor via the desired user sessions, a desired process from the alternate library and providing the desired process to the at least one target application; (f) processing, by the administrator portion of the at least one processor, at least one file based on the desired process to provide additional functionality not available without use of the desired process; wherein the processing includes at least one of opening and closing the at least one file; (g) terminating, by the administrator portion of the at least one processor, the desired user session after processing such that operation of the target application is limited by the user rights of the user associated with activation.

In embodiments, the desired user session is selected from a pool of desired used sessions active on the computer system.

In embodiments, the desired used session is dynamically generated after activation of the at least one target application is identified.

In embodiments, the alternate library is provided by a third party.

In embodiments, the alternate library is uniquely associated with the at least one target application.

In embodiments, prior to step (f) an authorizing step is conducted wherein the user associated with the activation is authorized to access the alternate library using the desired user section based on credential information associated with the user.

In embodiments, step (c) includes initiating at least a second desired user session and step (d) includes linking, the at least one target application to the alternate library associated with the at least one target application via the second desired user session and second enhanced user rights to access a second desired process from the alternate library and providing the second desired process to the at least one target application such that the at least one file is processed based on the second desired process.

A system of enhancing functionality of an application in a computer system in accordance with an embodiment of the present disclosure includes (a) at least one processor; and (b) one or more storage units operatively connected to the processor, wherein the one or more storage units include compiled computer executable code that is readable by the at least one processor to execute one or more executable applications using the computer system and computer executable code, wherein when executed by the at least one processor results in the processor performing the following steps: (i) storing, in the one or more memory storage elements, installation information including; (1) a list of a plurality of target applications; (2) configuration information related to each target application of the plurality of target applications; (3) user information related to a plurality of users of the computer system including user rights information; and (4) desired user information associated with a plurality of desired user profiles including enhanced user rights information; (ii) monitoring, by an administrator portion of the at least one processor, operation of the computer system to identify activation of at least one target application of the plurality of target applications by the at least one processor and a user associated with the activation; (iii) initiating, by the administrator portion of the at least one processor, a desired user session based on the desired user information to access the at least one target application; (iv) linking, by the administrator portion of the at least one processor, the at least one target application to an alternate library associated with the at least one target application via the desired user session and the enhanced user rights; (v) accessing, by the administrator portion of the at least one processor via the desired user sessions, a desired process from the alternate library and providing the desired process to the at least one target application; (vi) processing, by the administrator portion of the at least one processor, at least one file based on the desired process to provide additional functionality not available without use of the desired process; wherein the processing includes at least one of opening and closing the at least one file; and (vii) terminating, by the administrator portion of the at least one processor, the desired user session after processing such that operation of the target application is limited by the user rights of the user associated with activation.

In embodiments, the desired user session is selected from a pool of desired used sessions active on the computer system.

In embodiments, the desired used session is dynamically generated after activation of the at least one target application is identified.

In embodiments, the alternate library is provided by a third party.

In embodiments, the alternate library is uniquely associated with the at least one target application.

In embodiments, prior to step (b)(vi) an authorizing step takes place wherein the user associated with the activation is authorized to access the alternate library using the desired user section based on credential information associated with the user.

In embodiments, step (b)(iii) includes initiating at least a second desired user session and step (b)(iv) includes linking, the at least one target application to the alternate library associated with the at least one target application via the second desired user session and second enhanced user rights to access a second desired process from the alternate library and providing the second desired process to the at least one target application such that the at least one file is processed based on the second desired process.

BRIEF DESCRIPTION OF THE DRAWINGS

The above and related objects, features and advantages of the present disclosure will be more fully understood by reference to the following, detailed description of the preferred, albeit illustrative, embodiments of the present invention when taken in conjunction with the accompanying figures, wherein.

DETAILED DESCRIPTION OF THE EXEMPLARY EMBODIMENTS

Figure 1:
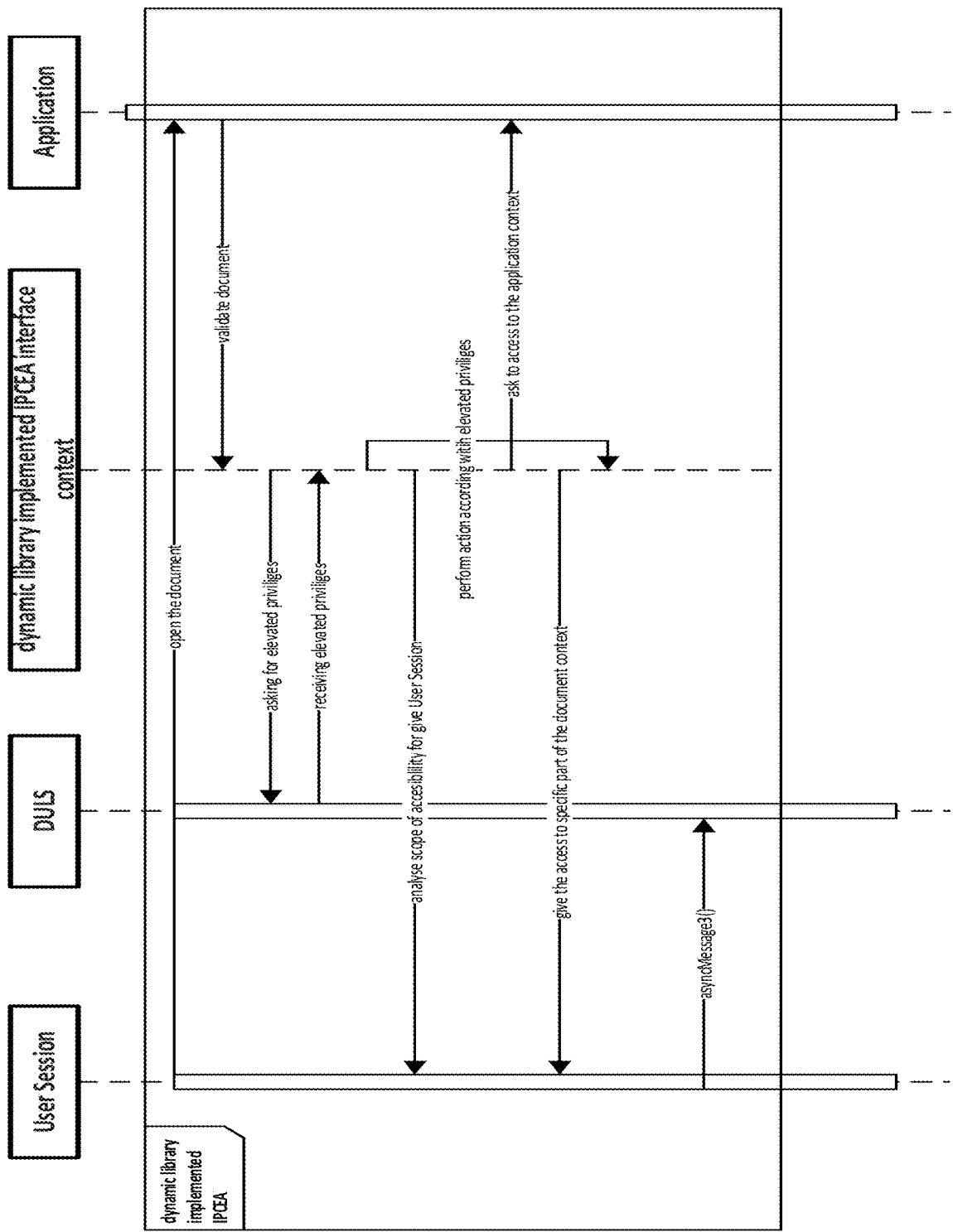
FIG. 1 illustrates interaction between an executable application, an IPC EA.dll, a desired user logon session and a user session.

The method and system of the present disclosure relate generally to application enhancement and interprocess communication. In embodiments, enhancement of the applications is achieved utilizing several different technologies and steps which are described further herein.

In embodiments, interprocess communication extension ability (IPC EA) may be implemented to provide for enhancement of one or more executable applications on a computer system. In embodiments, a monitoring may be used for managing interprocess communication between a dynamic library implemented by an IPC EA solution and an injected (or target) application, that is to be enhanced within the local administration rights. In embodiments, each attempt to run a new instance of the injected or target application, instantiates a new process to manage communication using the IPC EA solution. In embodiments, the IPC EA solution ensures security and allows for enhancement of instantiated processes using standardized credential permissions elevated by on one or more Desired Users Logon Session (DULS).

In embodiments, one or more DULS may be provided for use in the method and system of the present application in order increase user access to certain resources and functionality. Conventional user sessions typically restrict access to certain resources for certain users, while other users are allowed access to these same resources. In embodiments, in order to temporarily provide for limited enhancement of the rights of a user, the method and system of the present application may create a DULS. A DULS provides a temporary and restricted user session that allows access to resources via a process that provides the interface to such resources and functions. In embodiments, a DULS may be implemented either statically or dynamically.

In embodiments, a DULS may be implemented in a static manner. In this case, in embodiments, sessions are instantiated from a DULS pool which may include several DULS (see FIG. 3, or example). That is, a static pool of DULS may be kept active and may include the same features and/or permissions. In embodiments, each DULS may include different features and/or permissions. While the method and system of the present disclosure may be suitably incorporated into products, it is noted that the method and system of the present application are not limited to use with specific products.

In embodiments, a DULS may be implemented dynamically. In this case, the DULS is not part of a pre-existing pool of DULS, defined and loaded dynamically upon usage by the host program. In embodiments, this implementation may be similar to instantiating classes in that, a user or administrator may provide the DULS configuration information programmatically or via a pre-set configuration and the DULS is instantiated on an as needed basis whenever application enhancement requires a DULS. The decision on whether to use a pool DULS or a dynamically created DULS includes considerations similar to that used when choosing between thread pools or individual threads and relates to implementation and performance considerations.

In embodiments, the span of the DULS is only limited by the boundaries of the operating system or the programming language used in the computer system. In embodiments, the span of the DULS may be limited by the amount of allowed processes and/or the amount of allowed signed-in users permitted by the operating system of the computer system. In embodiments, one or more DULS may be used for a single enhancement of a target application. In embodiments, a single DULS may be used to implement multiple enhancements in a target application. The amount of DULS(s) required to solve the enhancement problem may vary. In embodiments, however, the effect of the DULS on performance of the computer system may be considered. For example, performance may be affected based on the processing power consumed by: (2) setting-up the DULS; (2) processing the enhancement and (3) keeping the DULS alive, to name a few. In embodiments, enhancements may require the use of more than one DULS. For example, multiple DULS(s) may be required where the enhancement necessitated more than one impersonation to provide the functionality to the target application.

In embodiments, enhancements may be injected into executable applications where the injection process may include loading a dynamic library into an application specific RAM context. In embodiments, enhancements may be hooked into a process of the application for opening a file, for example, such that the enhancement is initiated every time the application opens or creates a new file. The hooking process may vary dependent on the executable application at issue. In embodiments, where the target executable application uses structured storage, the application program interfaces (API's) that are hooked include StgCreateDocfile and StgOpenStorage. In embodiments, where the executable applications store documents as a flat file, the API's that are hooked include ReadFile, WriteFile etc. In embodiments, enhancements may be provided by implementing hooking methods like StgCreateDocFileHook, StgOpenStorageHook, ReadFileHook, WriteFileHook etc.

In embodiments, a default application may be instantiated from the Windows Shell, for example. Any attempt to open the file may invoke the process by hooking the enhancement to the method ReadFile.

In embodiments, an impersonation process may include an impersonation process used in combination with the Desired User Logon Session (DULS) which contains three layers of communications:

Executed process instantiated within the User Logon Session (ULS)

Process instantiated with DULS

Impersonation main executed process of the ULS by the DULS.

FIG. 1 illustrates exemplary interaction between the target application, the IPC EA solution via the DULS as well as the conventional user session in accordance with the above utilizing the impersonating process. Impersonation more generally refers to using another user session, such as the DULS, in order to perform certain functions in a user session.

In embodiments, switching the context from the normal user session to the DULS is done in two steps. First, a process is created in the DULS for performing desktop system bootstrapping, if necessary. A desktop bootstrapping process sets the environment for the impersonation process within the other user's environment. In embodiments, for some applications, processes need a properly instantiated desktop environment to be spawned in order to function properly, however, bootstrapping may not be required on all computer systems or with respect to all target applications.

Second, the impersonation process hands over a fully instantiated user logon session to the DULS.

In embodiments, the first step may be performed when the method and system are instantiated. The second step may be done within the application process. In embodiments, the second step may be started within a hooked method of the application, while first attempting to call the DULS system such that a first method is hooked before anything within the DULS context might be used.

After consuming the permissions from DULS, the impersonation process reverts back, since the present user session might need its own rights for performing other actions, which are not defined by the DULS. That is, the DULS may be used to provide for enhanced functions and typically will be unhooked after the enhancement has taken place such that the user session will thereafter proceed in a conventional manner.

For example, once data is gathered from the file with DULS permission, rights management service (RMS) permissions may be read from the file directly using the DULS permission. Relationships between the file path and the structure of all RMS permissions may be stored within the target process or application. In embodiments, this may be accomplished by decrypting a file within another user session, using a DULS, for example. In this case, unhooking is provided during and after the execution.

In this example, the IPC EA solution may be started in the background in an idle mode. Once an application is started, it may be compared with a list of defined applications names listing target applications. In embodiments, the IPC EA solution may be implemented by one or more processors of the computer system. In embodiments, the IPC EA solution may be implemented by an administrator portion of the one or more processors of the computer system. All of the applications on this list of defined application names are monitored for activation as potential target applications. If the application appears on the list, the application may injected with the injection dynamic library, by calling a LoadLibrary invoked from the victim process.

The injected dynamic library implemented by the IPC EA solution (e.g. hc.sheld.dll) may be hooked to the ReadFile API and is responsible for all action performed on the file when it is read. This library provides the application with access to additional functionality not available in its compiled form. In embodiments, hc.shiled.dll has its own overwritten method for replacing the original ReadFile API. Once the ReadFile API is invoked while attempting to open the document, the modified ReadFile from hc.shiled.dll is invoked instead of the original file. The ReadFile from hc.shiled.dll may then unhook because it needs to call the original method for opening the file, for further analysis.

In embodiments, a decrypted file may be stored only within the DULS context which prevents accessing the file from the current user logon session.

Figure 2A:
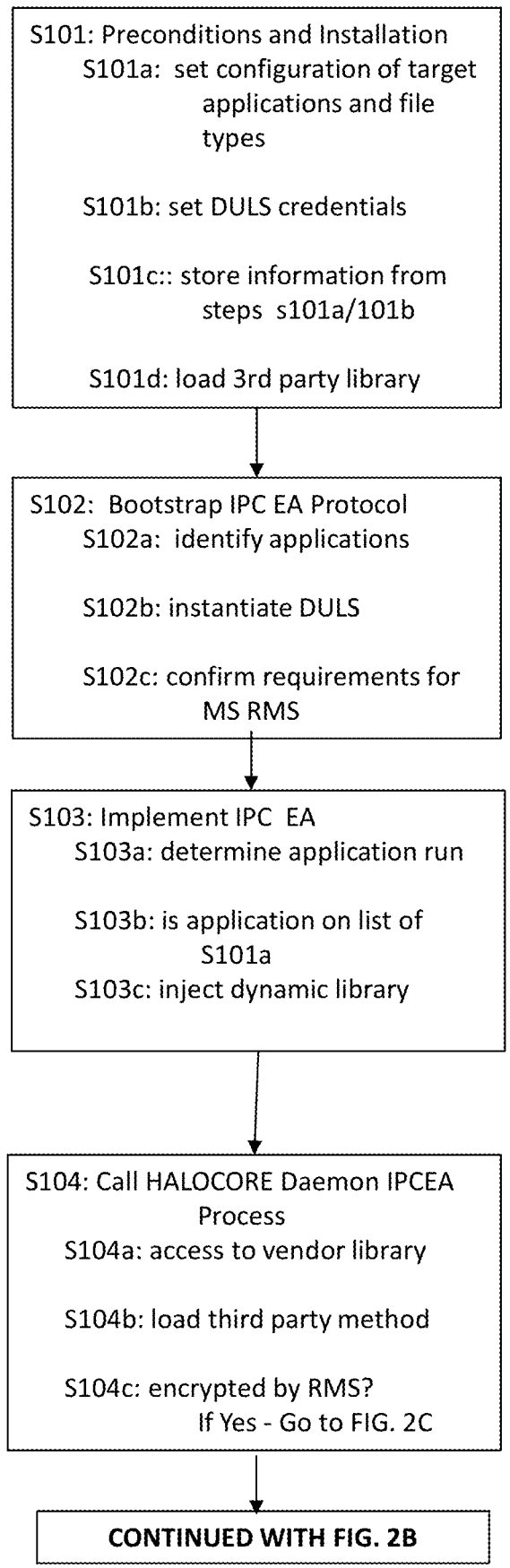
FIGS. 2A-2C illustrate an exemplary flow chart of a method of enhancing an executable application in accordance with an exemplary embodiment of the present application.
Figure 2B:
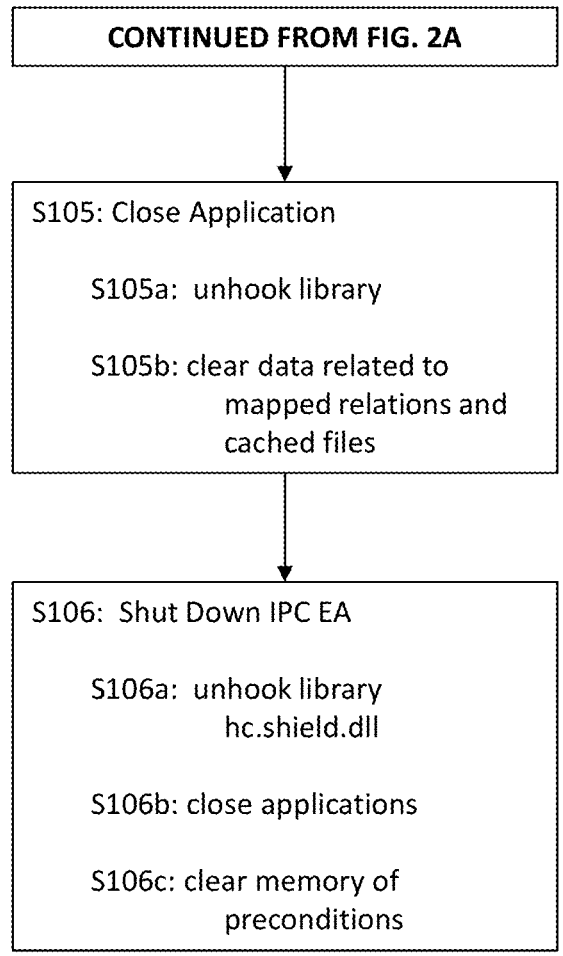
Figure 2C:
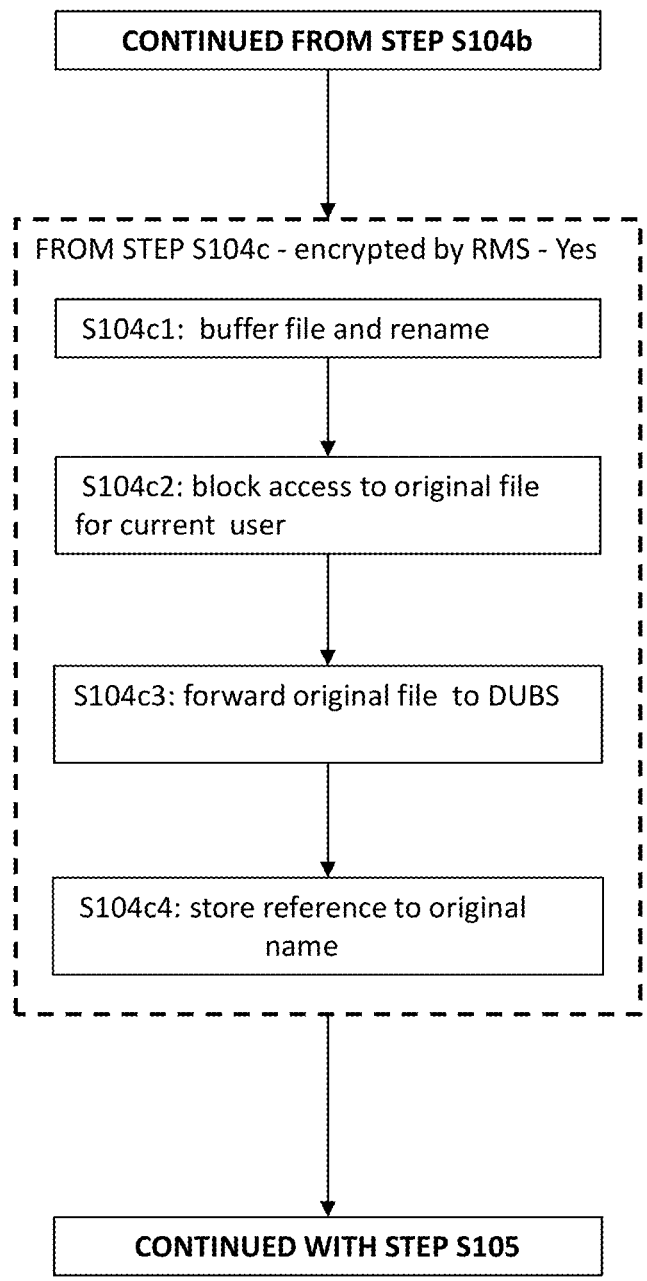

FIGS. 2A-2C illustrate an exemplary flow chart of a method in accordance with an embodiment of the present application to enhance functionality of a targeted application. In step S101, preconditions and installation may take place. In embodiments, third party vendors may want to use the selected target application in the context of their own logic, essentially extending their application with the DULS functionality. In such embodiments, preconditions may be divided into steps: A) design: API+design of the third party vendor, B) in the development process 3) applications+ implemented library+API_+configuration. The application must exist before the system will run, but need not exist during this installation step.

In embodiments, at step S101a, a set configuration of target applications and file types may be set. This configuration may be provided externally from a user or administrator or may be provided as part of the original configuration of the targeted application. Subsequently, in step S101b, DULS credentials may be set along with other requirements. These credentials may be provided by a user or administrator. In embodiments, the credentials used for the DULS may be similar to those used for local machine users or domain users, in order to spawn impersonation capabilities. In embodiments, installation DULS(s) may create their own user account on local machines. In embodiments, accounts may be created automatically, accessible from the system, and features and permissions may be applied to the DULS based on the configuration. While running the method and system, a DULS may be invoked dependent on the configuration and logic implemented in the third party library (dll) over the interface provided by the system and method of the present application as well. In embodiments, the DULS may be stored in a configuration including identifiers of each DULS with selection based on input. As noted above, a DULS may be defined as static or dynamic. In step S101c, the above information may be stored in secure data storage (for example, in the Windows Vault) or elsewhere. In step S101d, a third-party vendor dynamic library may be loaded and implemented based on a provided IPC EA protocol, for example, the HALOCORE® Daemon IPCEA Protocol (HALOCORE is a registered trademark of the applicant Secude AG).

In step S102, the IPC EA solution may be bootstrapped. This may include identifying applications to be enhanced (target applications), at step S102a. In embodiments, step S102a may include storing names of the target applications within one or more data storage elements. In embodiments theses names may be preloaded above. In embodiments, only the name of the application's executable file may be needed. At step S102b, a DULS may be instantiated in the user session, for example, within a Windows Desktop session, according to credentials and permissions and all necessary data required by third-party vendor requirements associated with the target applications, as appropriate. In embodiments, at step S102c, in the specific case of a Microsoft RMS, all prerequirements must be met in accordance with the Microsoft RMS specification.

At step S103, in embodiments, the IPC EA solution may be implemented and in step S103a, a determination may be made as to whether or not an application is running. In embodiments, this may be accomplished by monitoring operations of the computer system. At Step S103b, after an application begins to run, a determination may be made as to whether the application is on the list of target applications set in step S101a and a DULS may be instantiated. This may be done either by pooling, i.e. based on the DULS pool, or by an event of a newly instantiated application, which triggers instantiation of an DULS. Thereafter, the HALOCORE® Daemon IPC EA dynamic library ("hc.shield.dll"), a third party vendor library, for example, may be injected into target application with help of CreateRemoteThread. In addition, hc.shield.dll code may also be injected into the application memory. In embodiments, the hc.shield.dll code may be provided in its own memory space.

As step S103c, in embodiments, different application intercept modes may be implemented. In one example, the intercept may be incorporated in the Default Windows Shell opening execution method. In another embodiment, the intercept may be implemented by hooking into the ReadFile API as noted above. In embodiments, application internal functions or other operating system provided functions may be intercepted, depending on the functionality that is being enhanced. In embodiments, more than one function may intercepted in order to provide more complex enhanced features.

In step S104, in one example, the HALOCORE® Daemon IPC EA Process may be called. In embodiments, other IPC EA processes may be used. In step S104a, in embodiments, a library implemented by a third party vendor over the process has access to the list of defined DULS, list of applications, list of file types as well to the common relations to all of them. In step S104b, the method of access implemented by the third party vendor to the library may be loaded and invoked. At step S104c, in the specific case of RMS protection, an opened file may be analyzed to determine if it is encrypted by the RMS rules. If so, the original file may be buffered in place under a new unique name in step S104c1 (see FIG. 2c, for example). In steps S104c2, access to the original file may be denied to the current user. At step S104c3, the original file may be forwarded to a selected one or more DULS and may be decrypted within the impersonation process of the DULS. In step S104c4, all references between the unique name and the original name are stored within the application session. In embodiments, once the file is closing, when the DULS doesn't have permission to the file, the original but decrypted file is deleted, and exchanged for the buffered earlier file.

At step S105, the closing of the application may also be intercepted. At step S105a, a third party library (e.g. hc.shield.dll) may be unhooked from that applications. In step S105b, allocated data for mapped relations between cached files and original file names may be cleared.

At step S106 the IPC EA may be shut down. At step S106a, all instances of the third party library may be unhooked from all applications. Then, at step S106b the specified applications may be closed in accordance with conventional procedures. At steps S106c allocated data from the memory for preconditions is cleared.

In embodiments, the method and system may provide a standardized interface (API). In embodiments, the method and system of the present application may provide a unified interface for injection of any third party implemented dynamic library, such as, but not limited to hc.shield.dll into the target applications. In embodiments, the one standardized interface may allow, without additional implementation on the application site, any dynamic library to connect and intercept the context of the applications.

In embodiments, the method and system of the present application may provide for IPC extension through DULS management. In embodiments, a predefined layer of user impersonation management may be used to achieve access to the application context. In addition, the method and system of the present application provide a predefined architectural solution based on concurrency to extend the performance between injected dynamic library and destined application. IPC extension may be used in the executed processes of the management of Desired User Logon Sessions with interprocess communication management.

Figure 3:
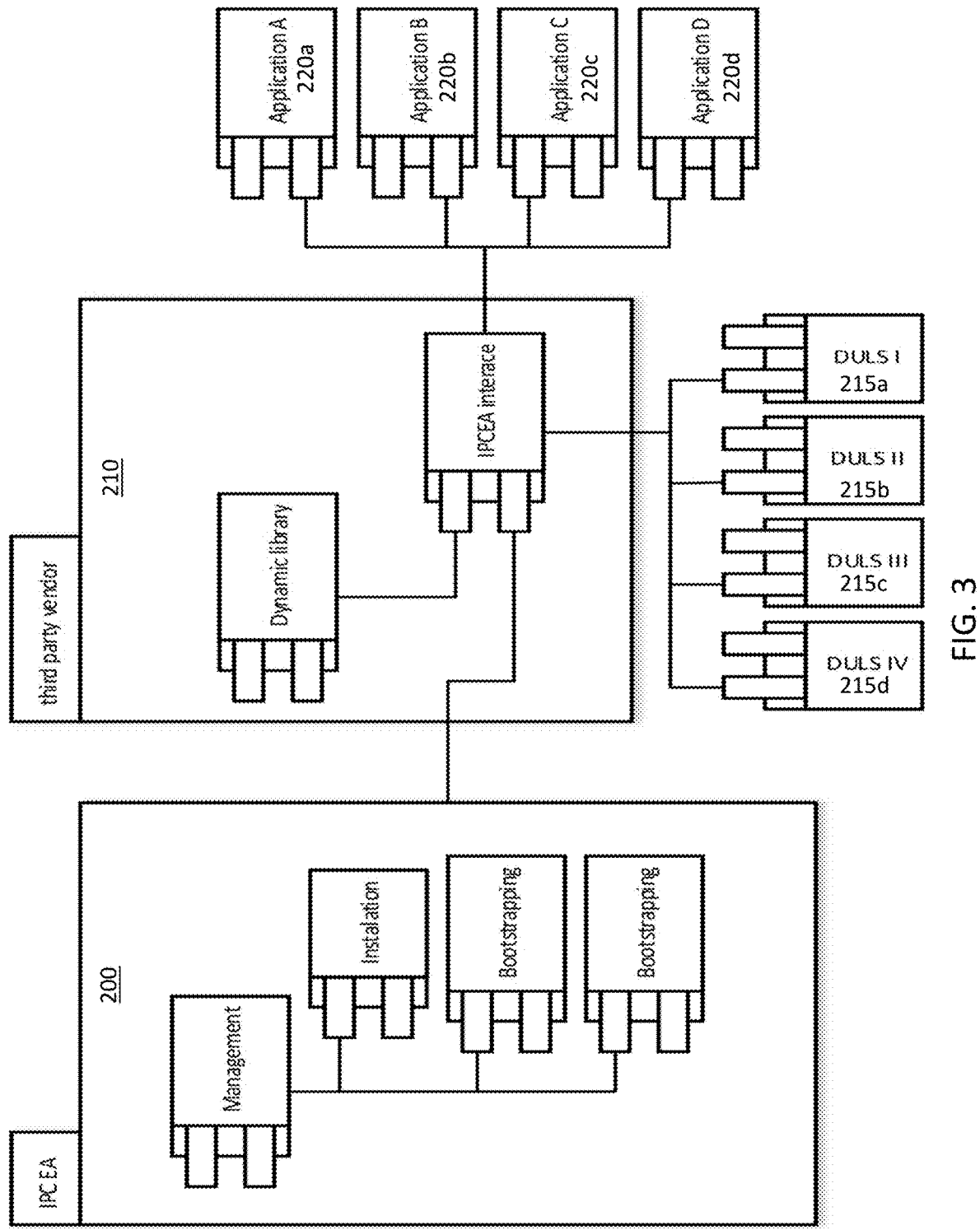
FIG. 3 is an exemplary schematic illustrating interaction between an IPC EA, third party vendors, various desired user logon sessions and various executable applications in accordance with an exemplary embodiment of the present disclosure.

FIG. 3 illustrates an exemplary schematic illustrating interaction between the IPC EA solution 200, third party vendor libraries 210, various DULS 215a, 215b, 215c and 215d and various applications 220a, 220b, 220c, 220d. As illustrated, in embodiments, the applications 220a-220d are accessed via the interface of the IPC EA to provide the third party library dll to the application based on permissions provide by the DULS such that the application may process files based on functionality provided by the third party library.

In embodiments, the following pseudo code may be used to implement the method and system described herein. This exemplary pseudocode provides an example in which the method and system may be implemented as a generic API, providing enhancement capabilities to any 3rd party vendor target applications. Thus, the method and system of the present application solve the technical problem presented by the lack of transparency that is available when using executable applications.

A Context_Application structure may provide a main structure constrained in the context of the impersonation process as well as structure of accessing an already injected application.

```
struct Context_Application
{
    Context_Impersonalisation impersonalisation_;
    Context_Process         process_;
    Context_Shell           shell_;
    Context_GUI             gui_;
    File_Types              _ARRAY_(file _types_);
};
```

A Context_Process structure may provide to the application remote threads, application memory and may contain a defined customized thread pool instantiated within the application memory dedicated for utilizing by the third-party vendor library.

A Context_GUI structure may be used to access a Windows application, if applicable. If the target application is a standard desktop application, this structure may provide access to the handle of the main window, as well as to a menu context and the standardized predefined handle to the context of GUI Menu of the IPC EA. In embodiments, every third-party application implemented IPC EA may have a unified form of GUI menu and dialog About. The GUI menu may be further extended from within the third-party dynamic library to indicate the enhanced functionality.

A Context_Shell structure may vary in complexity. In one embodiment, the module includes instructions for implementation of the third party dynamic library dedicated for injection into the target application. It may contain standardized functions used to allowed access to the context of the applications using scripting language.

In other embodiments, the module includes instructions for implementation of the owner of the injected application. In some cases, a vendor of a target application, might decide to implement additional functionality which might be shared over a common IPC EA additional access to the specific application contexts.

A Context Impersonalisation structure may include predefined relations between the DULS and allow users for a given application context. This module may govern interaction between a user session, DULS, third party vendor library and the application or document produced by the application. The following pseudocode is suitable for implementing this module.

```
struct Ctx_Impersonalisation
{
    DULS_ARRAY_(duls_);
};
```

```
        struct User_Credential
        {
           _STRING_ login_;
           _STRING_ domain_;
           _FUNCTION_ authentication _;
        };
        struct DULS
        {
           _ENUM_ mode_ { static_, dynamic_ };
           User_Credential user_credential_;
           User_Credential _ARRAY_(users_);
        };
```

A User_Credential structure may contain plain user account information as well as a pointer to a procedure which may be triggered while doing authentication. A vendor of the dynamic library may override this function in which case the user may be validated inside the IPC EA management process during bootstrapping.

Figure 7:
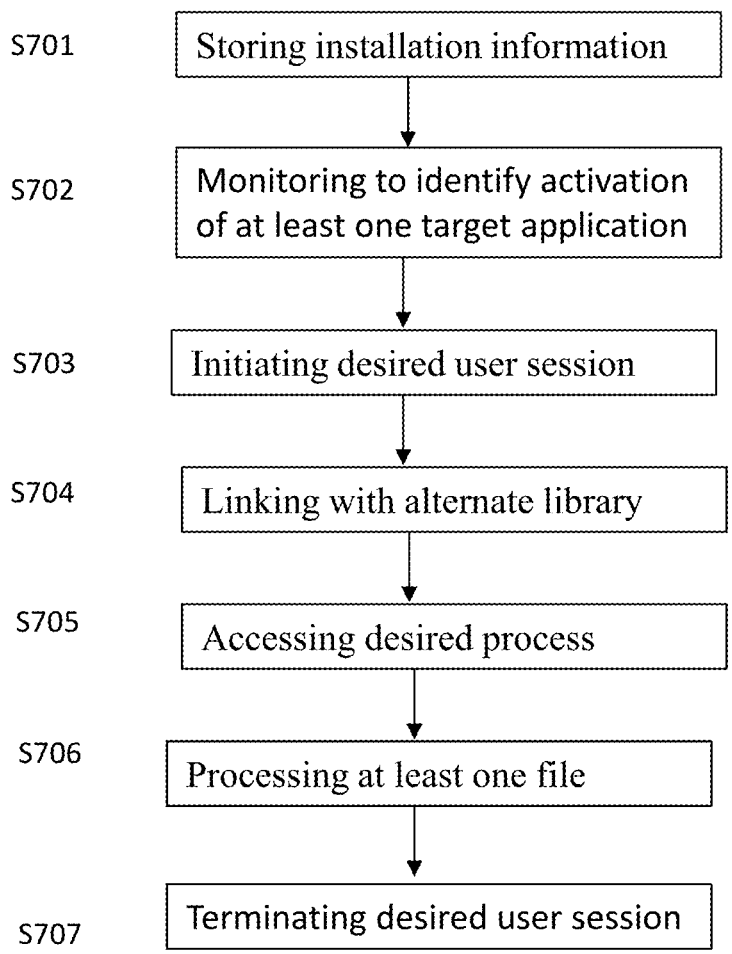
FIG. 7 illustrates an exemplary flow chart of a method of enhancing functions of an executable application on a computer system in accordance with an embodiment of the present disclosure.

FIG. 7 illustrates an exemplary flow chart of a method of enhancing functionality of an executable application on a computer system in accordance with another embodiment of the present disclosure. In embodiments, at step S701, installation information may be stored in the one or more memory storage elements. The installation information may include: a list of a plurality of target executable application; configuration information related to each target application of the plurality of target applications; user information related to a plurality of users of the computer system including user rights information; and desired user information associated with a plurality of desired user profiles including enhanced user rights information. In embodiments, the installation information may be pre-loaded into the one or more storage elements such that this step may be skipped.

In embodiments, at step S702, the at least one processor or at least a portion thereof, such as an administrator portion, monitors operation of the computer system to identify activation of at least one target application of the plurality of target applications by the at least one processor and a user associated with the activation. In embodiments, the at least one processor may access the installation information to identify the at least one target application of the plurality of target applications and the user associated with the activation.

In embodiments, at step S703, a desired user session may be initiated by the processor or portion thereof, wherein the desired user session is based on the desired user information and may be used to access the at least one target application using the enhance user rights. In embodiments, the desired user session may be selected from a pool of desired used sessions active on the computer system. In embodiments, the desired used session may be dynamically generated after activation of the at least one target application is identified. In embodiments, at least a second desired user session may be initiated.

In embodiments, at step 704, the at least one target application is linked with an alternate library associated with the at least one target application via the desired user session and the enhanced user rights. In embodiments, the alternate library maybe provided by a third party. In embodiments, the alternate library may be uniquely associated with the at least one target application. In embodiments, the alternate library may be associated with a plurality of target applications. In embodiments the at least one target application may be linked with the alternate library via the second desired user session.

In embodiments, at step S705, a desired process from the alternate library may be accessed and provided to the at least one target application. In embodiments, a second desired process may be accessed and provided to the second desired user session.

In embodiments, at step S706 at least one file based may be processed based on the desired process to provide additional functionality not available without use of the desired process; wherein the processing includes at least one of opening and closing the at least one file. In embodiment, the at least one file may be processed based on the second desired process.

In embodiments, at step S707, the desired user session may be terminated after processing such that operation of the target application is limited by the user rights of the user associated with activation.

Figure 4A:
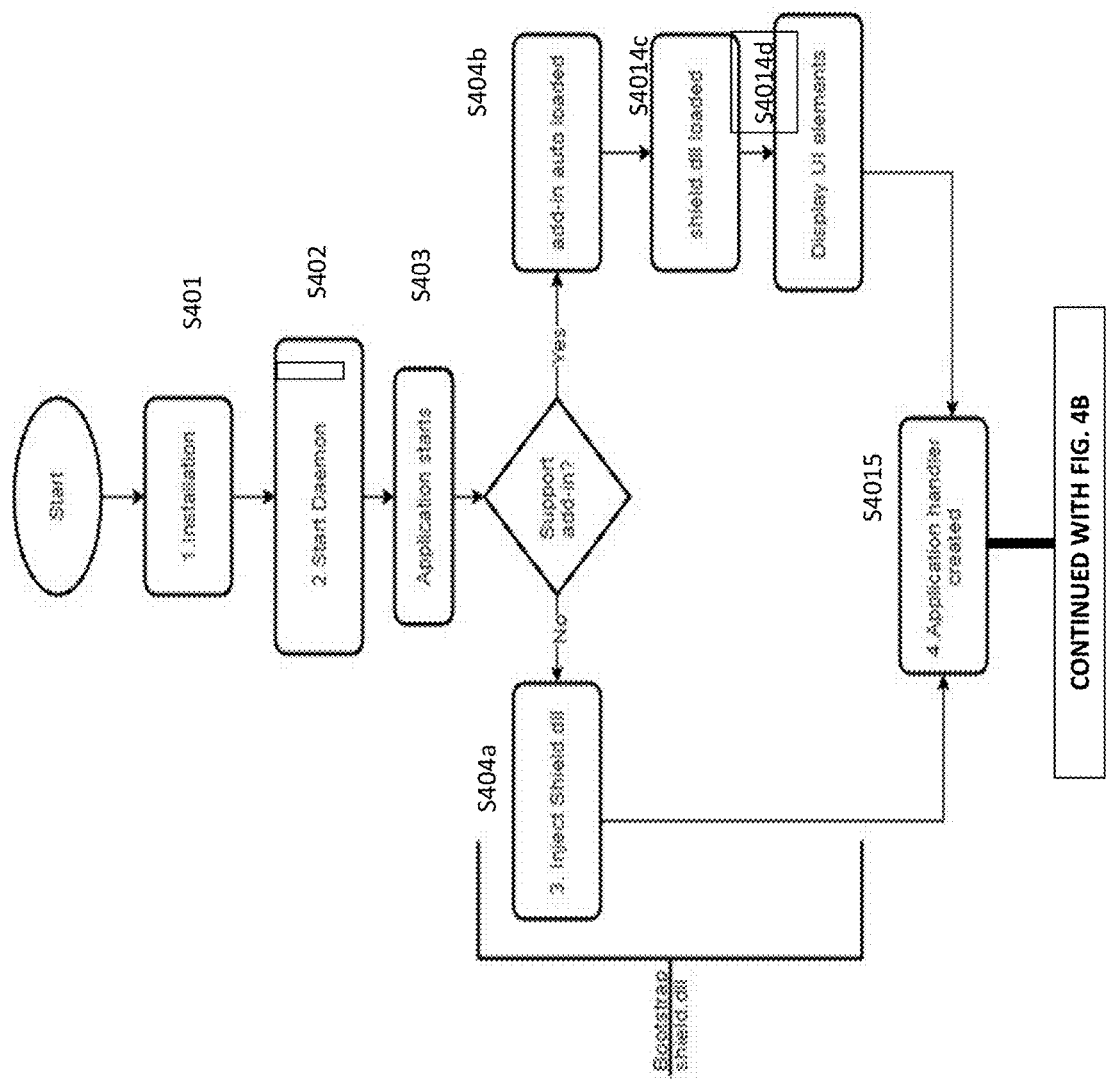
FIG. 4A-4C illustrate an exemplary flow chart of a method of enhancing an executable application in accordance with another exemplary embodiment of the present application.
Figure 4B:
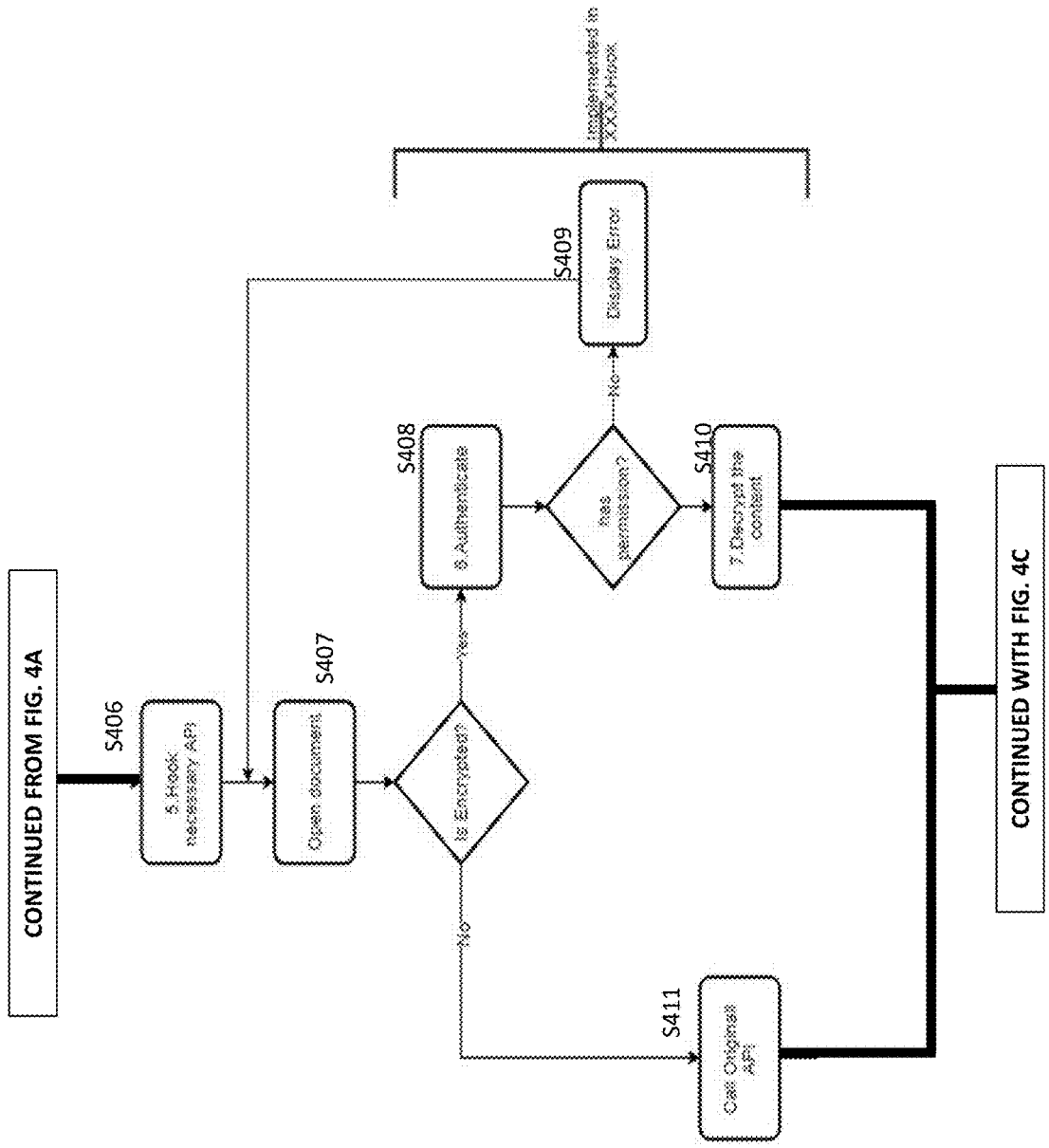
Figure 4C:
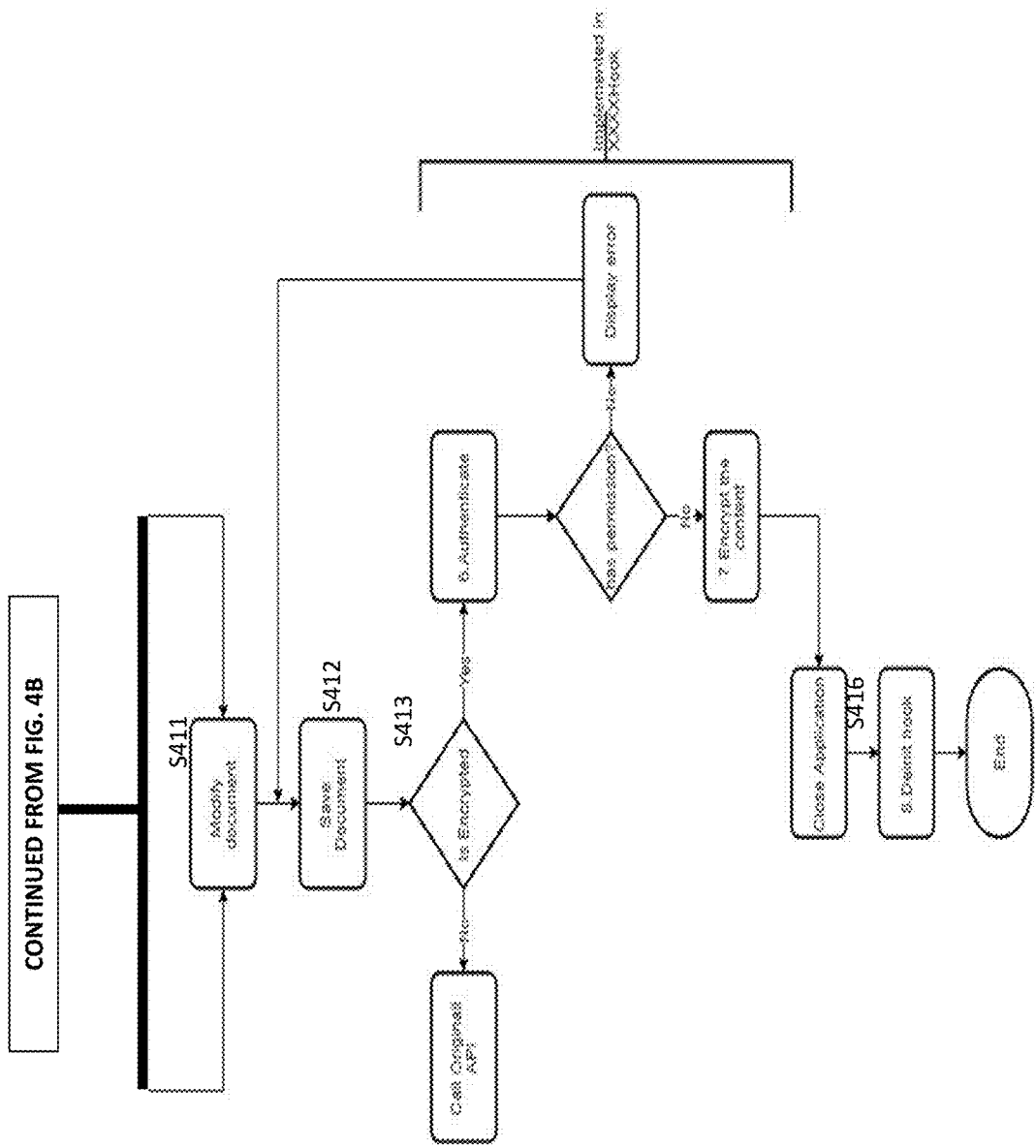

In embodiments, the method and system of the present application may be implemented without the use of a DULS, if desired. FIGS. 4A-4C illustrates an exemplary flow chart illustrating a method of enhancing an application on a computer system. Step S401 is an installation step. In embodiments, a user or administrator may provide a list of one or more target applications to which it is desired to provide enhance functionality. This list may be stored in one or more storage elements. Authentication and end point details for each of the applications may be collected and stored in the one or more storage elements which may be operatively connected to the computer system running the application. In embodiments, the end point details may be stored in one or more configuration files. In embodiments, the one or more configuration files may include the list of target applications to be targeted for enhanced functionality. For those applications that provide add-in support, add-in configuration information may be copied to a respective application specific folder for each of the target applications that provide add-in support. Some example of applications that typically allow for add-ins include LibreOffice and AutoDesk applications such as Inventor, AutoCAD and various browsers, to name a few. In embodiments, the add-ins (or plug-ins) plug-ins may provide UI theming or add-blocking functionality, to name a few.

In embodiments, any third-party libraries used to provide enhancements may be copied to a respective application specific folder for each of the target applications on the list. These libraries are typically specific to the target application. In one example, an invention library may be provided to integrate some pieces into a target application. In embodiments, the installation step S401 may be previously performed with the results saved in the one or more storage elements such that repeating the steps may not be necessary for every implementation of the method.

In embodiments, at step S402, a background program, such as the HALCORE Daemon discussed above may begin. In embodiments, the background program daemon may already be active and this step may be skipped.

In embodiments, at step S403, monitoring may identify that an application has begun on the computer system, based on user interaction or otherwise. In embodiments, the application may be one of the target applications. In embodiments, this may include processes in the configuration file associated with the application beginning, for example, Notepad, ConvertUtility and Viewer app. In embodiments, such applications are specified in the configuration and additional capabilities may be added to them.

In embodiments, when the target application does not allow for add-ins/plug-ins or the add-ins capabilities are not enough, a shield dll file may be injected into the application at step S404a. In embodiments, this may include writing instructions to load the shield dll file in an application specific random access memory (RAM) location. In embodiments, each target application may be associated with its own respective RAM location. In embodiments, a single RAM location may be used to store a shield dll file that may be associated with one or more applications. In embodiments, the application may load a library into memory in a variety of ways. In embodiments, the application may call a loadLibrary function. In embodiments, the application may statically link to the dll library. In embodiments, the shield dll may be stored in a single location and shared or may be separately stored in a application specific location for each application that will us the file. In embodiments, the injection step may also include creating one or more remote threads associated with the application as well as executing instructions in the application.

In embodiments, in the event that add-ins/plug-ins are permitted in the application, at step S404b, an add-in may be auto-loaded into the application. In embodiments, at step S404c, the shield Dll for the add-in may be loaded into the application. In embodiments, step S404c may be similar to the injection step 404a discussed above. In embodiments, where an application allows for add-ins, for example in Microsoft Excel or AutoCAD, users may be allowed to customize an associated API such that the API itself may be modified to load the shield dll. In embodiments, a user interface may be displayed to prompt the user for desired inputs at step 404d.

In embodiments, upon being loaded or injected into an application, the respective shield Dll file may create an application handler that is specific to processes that are carried out by the application at S405. In embodiments, the shield Dll file may create an application handler that is unique to each specific application. In embodiments, the application handler will initialize a list of application program interfaces (API's) that may be hooked in order to allow for enhancement of application operations.

In embodiments, API hooking may begin or take place at step S406. In embodiments, an original API function implementation address may be stored. In embodiments, instructions to jump to a default hooking function, a modified application program interface, are provided at the start of the original API function. In embodiments, the default hooking function will call the application handlers implementation of the particular API and check the continue flag associated therewith. Where the continue flag is set, the default hook function will invoke the original function of the API. Otherwise, the original function of the API may be skipped and values are returned from the handler call based on a modified API. For example, in a particular application, a particular function may rely on certain input and output values. In embodiments, the hooked function and modified API will provide the same input and output values, at least in terms of structure, if not content. The modified API provides the additional functionality used to enhance the file or files processed by the target application. In embodiments, the API may be used to open a document for example as step S407.

In embodiments, an authentication step may be used in order to complete the enhancement of functionality. In embodiments, functionalities may depend on user permissions. In embodiments, a decision as to whether authentication is required is made at step S408. If so, in embodiments, an authentication dialogue may be invoked before starting any user permission related functionality on a document, for example at step. In embodiments, the authentication dialogue may be based on Active Director Authentication Library v1.0 (ADAL). In embodiments, the token provided via ADAL may be used for authorization purposes with the specific environment, i.e. Azure portal. In embodiments, other environments and/or other authorization processes may be used. In embodiments, an authorization module may be used to cache user credentials for a session to allow them to be reused when required. In embodiments, in the event that authentication fails, S409, an error message may be provided and opening, displaying or saving of document may be aborted. Otherwise, encryption/decryption may proceed at step S410. If encryption/decryption is not necessary, the original API may be used to proceed in a conventional many at step S411 and may be further modified at step S412. The modified document may be saved at steps S412.

In embodiments, a decision as to whether to encrypt the modified file may be made in step S413. If not, the original API may be used. If so, the authentication process discussed above may be repeated to determine whether the user has authority to encrypt.

In embodiments, different applications may use different methods to store data in a file or document. Applications that store files using structured storage typically use either (1) StgCreateDocfile or (2) StgOpenStorage API's. In such applications, API hooking, as described above, may be used to enhance functionality. In embodiments, applications may use flat file storage. These applications typically use one of (1) SetFilePointerEx, (2) ReadFile (3) WriteFile) and (4) CloseHandle as API's. The above embodiments focus on functions used to hook into file specific features on Windows for the purpose of enhancing the application with encryption, decryption and policy enforcement. In embodiments, the system and method of the present application may be user to enhance and hook into completely different methods depending upon the purpose of the enhancement. In embodiments, hooking may also be used to enhance the functionality of application using these API's. In embodiments, whether the API uses structured storage or flat storage is recorded during installation such that the relevant API's to be hooked are known in advance.

In embodiments, the default hook function may call Microsoft Information Protection Software Developer's Kit (MIP SDK) API's to encrypt/decrypt a file which will in turn call readfile/writefile APIs to read and or write the decrypted or encrypted file. In embodiments, in order to avoid hooking additional APIs while already invoking a default hook function, a member variable may be set to indicate that the process is currently in a default hook function when the controller enters the first line for the default hook function. This variable, or flag, may be reset before return. An example is provided below:

```
BOOL skip_hook = FALSE;
BOOL ReadFileHook(
    HANDLE hFile,
    LPVOID lpBuffer,
    DWORD nNumberOfBytesToRead,
    LPD WORD lpNumberOfBytesRead,
    LPOVERLAPPED lpOverlapped,
    bool &bContinue)
{
    bool result = FALSE;
    if (skip_hook)
        return FALSE;
    try
    {
        skip_hook = true;
        if (IsProtected(hFile))
```

```
    {
        //Reading operations
        ...
    }
    else
        res = FALSE;
}
catch(...)
{
    ...
}
skip_hook = false;
return result;
}
```

In the case where the hook function is called while a hook function is in progress, the original function implementation may be called.

In embodiments, handle related information may be stored using FileHandleInfo structure, which caches handle related information and stores it. The same information may be accessed when any operation is performed using the same handle. The handle cache may be cleared when a close-handle API is called. An exemplary embodiment of the FileHandle Info structure is provided below:

```
struct FileHandleInfo
{
    std::string filename;
    bool encrypted;
    std::string extension;
    bool is_writemode;
    unsigned long long plain_content_size;
}
```

In embodiments, for encrypted files, the MIP stream for that file may be stored against the handle of the file.

After the add-in is de-initialized, the APIs may be unhooked at step S416 replacing the original instruction associated with the application and/or its API.

In embodiments, StgCreateDocFilHook may be implemented. In embodiments, where a new file is to be encrypted, an empty file may be protected with a label. In embodiments, the term label, is an enhancement specific term that relates to the specific function provided by the enhancement, for example, decrypt/encrypt content using MIP SSK. In embodiments, an MIP stream based on the protected file may be created with a ILockByte interface. In embodiments, storage may be created with ILockBytes using the API StgCreateDocfileOnILockBytes and then the storage may be returned. In the event that the file need not be encrypted, a flag to call the original API may be set since the additional functionality may not be needed.

StgOpenStorage Hook may be used for opening files. In embodiments, where the file to be opened is encrypted, the user may be authenticated to ensure they have authority to access the file. This authorization may use ADAL as described above. Thereafter, an MIP stream from the protected file may be create with ILockByte interface. Thereafter a call to tgOpenStorageOnILockBytes may be made and the storage may be returned. If the file is not encrypted, the flag to call the original API may be set.

SetFilePointerExHook may be used to set pointers. If the file involved is encrypted, the pointer in the MIP stream and file may be moved. Where the file is not encrypted, the flag to call the original implementation may be set.

ReadFileHook may be used to read a file. In embodiments, the first time read file is called, the new MIP stream based on the file is created. In embodiments, thereafter the data will be read from the MIP stream by decrypting the file portion in memory. In embodiments, from the next read call, the existing stream stored in cache is used and data may be read from the MIP stream.

The WriteFileHook may be used to write to files. In embodiments, the first time write file is called, the encryption state may be retrieved from hc.ui. In embodiments, when the current document is set with a label, the new MIP streams a file with protected extension and write operation is done with that stream. In embodiments, the original file may be written with empty content. In embodiments, at the next write call, the existing stream stored cache may be used and information may be written to the encrypted file. In embodiments, the file pointed to by the handle may also be moved to the length of write buffer.

CloseHandleHook may be used to close files. In embodiments, the handle information associated with the handle may be retrieved. If the file is encrypted, in embodiments, the cached MIP stream may be removed and the MIP stream file may be replaced with the original file. In embodiments, the handle information is then cleared from the cache.

Figure 5:
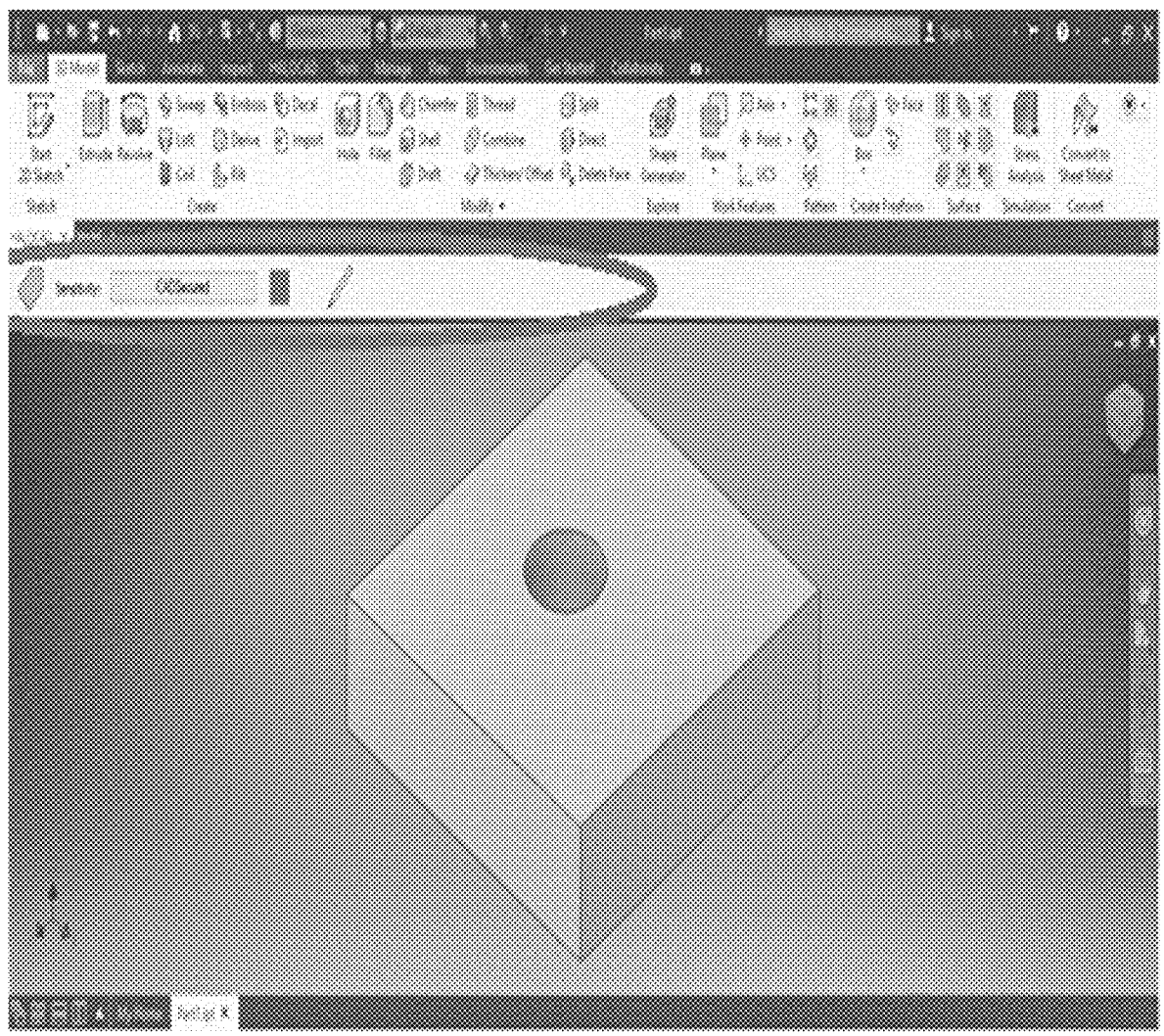
FIG. 5 an illustration of an exemplary screen shot of a user interface.
Figure 9:
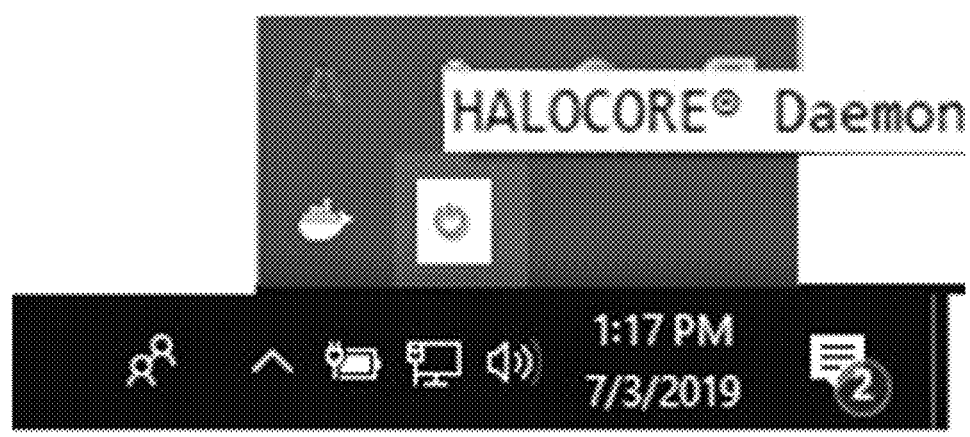
FIG. 9 illustrates and exemplary user interface for a daemon process that may implement the method and system of the present disclosure.

In embodiments, where an application allows for add-ins, a Generic User Interface (UI) element may be displayed using a UI customization API such as AddControlBar(CustomUIDilaogHandle) or ShowStatusDialog(resourceId)) to name a few. In one example illustrated in FIG. 5, a generic UI in the application is displayed as feature add-on. In embodiments, where add-ins are not permitted. The daemon process may display a UI in a desktop window, as illustrated in FIG. 9, for example. In embodiments, a generic UI may be provided as a separate Dll file and plugged into the desired parent frame window.

Figure 6:
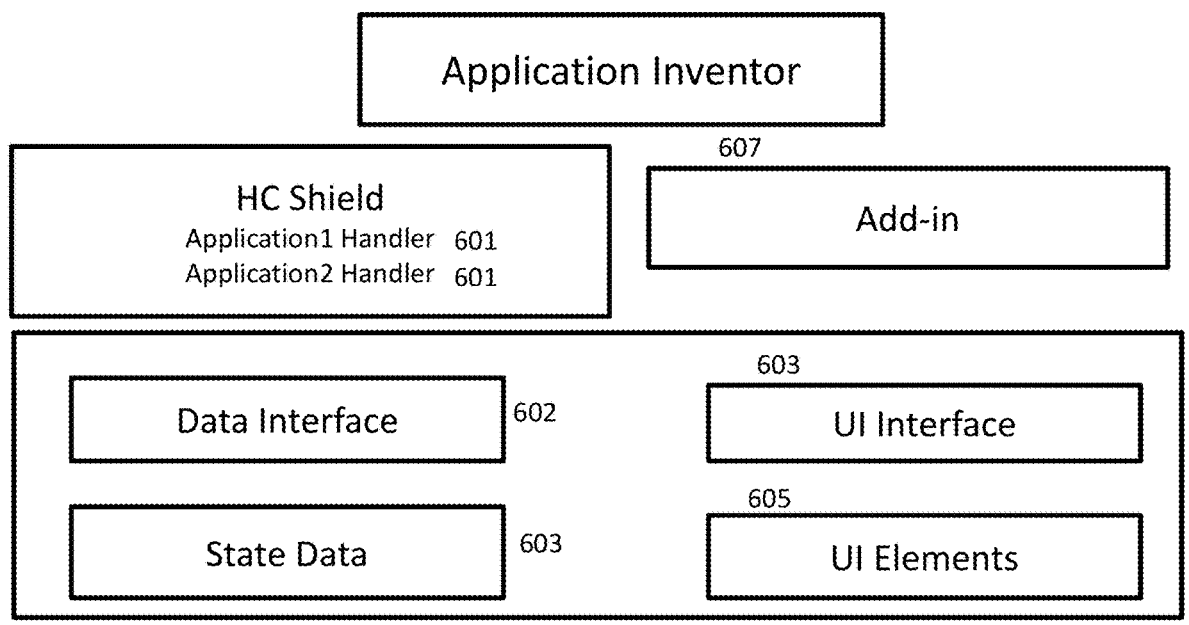
FIG. 6 is illustration of an exemplary architecture of a shield module in accordance with an embodiment of the present application.

In embodiments, the injected shield discussed herein may be implemented as a shield module. FIG. 6 illustrates an exemplary architecture of such a shield module 600 that is sufficiently flexible to interact with a variety of applications. In embodiments, the module may include or provide a variety of application handlers 601. In embodiments, the shield module may include a user interface 602 and a data interface 603. State data 604 may be included as well as user interface elements 605. In addition, the shield module may include storage for user interface elements as well as storage for state data. In embodiments, an add-in interface 607 may be provided as well for use with those applications that permit add-ins as discussed above.

Figure 8:
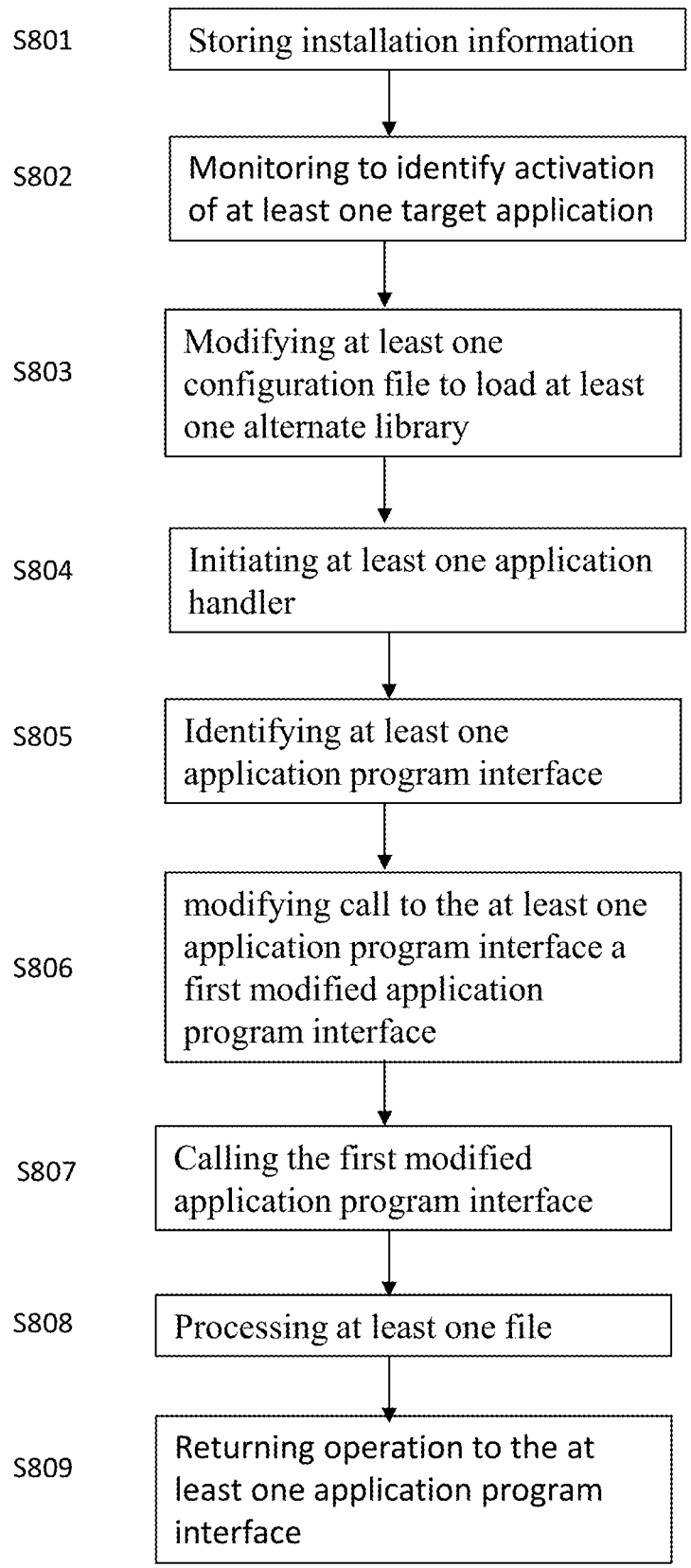
FIG. 8 illustrates an exemplary flow chart of a method of enhancing functions of an executable application on a computer system in accordance with another embodiment of the present disclosure.

FIG. 8 illustrates an exemplary flow chart of a method of enhancing functionality of an executable application on a computer system in accordance with an embodiment of the present disclosure. In embodiments, in step S801, installation information may be stored in one or more memory storage elements. In embodiments, the installation information may include a list of a plurality of target executable application; and configuration information related to each target application of the plurality of target applications. In embodiments, the configuration information may include API information identifying at least one application program interface associated with each target application. In embodiments, the installation information may be preloaded in the one or more memory storage elements such that step S801 may be skipped.

In embodiments, at step 802, the at least one processor of the computer system, or at least a portion thereof may be used to monitor operation of the computer system to identify activation of at least one target application of the plurality of target applications by the at least one processor. In embodiments, a list of target application may be stored in the one or more storage elements and accessed by the at least one processor, or portion thereof to determine whether a target application has been activated.

In embodiments, at step S803, at least one configuration file associated with the at least one target application may be modified to load at least one alternate library associated with the target application. In embodiments, the configuration file may be modified by changing an address of an application specific random access memory (RAM). In embodiments, the configuration file may be modified to include a flag that may be used to refer to the alternate library.

In embodiments, at step S804, at least one application handler associated with the at least target application may be initialized from the alternate library.

In embodiments, at step S805, a least one application program interface associated with at least one enhanced function to be provided by the at least one target application may be identified using the application handler. In embodiments, multiple application program interfaces may be associated with the enhance function.

In embodiments, at step S806, a call to the at least one application program interface may be modified to include an alternate address associated with a first modified application program interface. In embodiments, where more than one application program interface is identified the call to the at least one application program interface may be modified to include at least a second alternate address associated with a second modified application program interface. In embodiments, the modified application program interface may be provided by the alternate library. In embodiment the alternate library may include includes at least a second modified application program interface associated with each target application.

In embodiments, at step S807, the first modified application program interface may be called. In embodiments, the second modified application program interface may be called.

In embodiments, in step S808, at least one file may be processed by the at least one target application using the modified application program interface to provide additional functionality not available without use of the modified application program interface. In embodiments, the processing includes at least one of encrypting and decrypting data in the at least one file on the fly without using a temporary file. In embodiments, the processing may include reading and/or writing date from or two the at least one file. In embodiments, the processing may include any additional function that may be provided with reference to the alternate library. In embodiments, the at least one file may be processed based on the second modified application program interface.

In embodiments, at step S809, operation of the at least one target application may be returned to the at least one application program interface to provide for conventional functionality of the target application.

In embodiments, the decryption and/or encryption of data in the at least one file may include steps of determining that the data is one of encrypted and decrypted, in the case where the data is one of encrypted and decrypted, further comprising, determining that authorization is required to encrypt or decrypt the data; authorizing at least one user based on identification information associated with the user, after authorizing the user, encrypting or decrypting the data in the at least one file and storing the at least one file.

In embodiments, the system and method of the present disclosure provide a variety of benefits. In embodiments, different sets of API functions may be hooked for different applications. In embodiments, hooking may be done to extend the functionality of an application that doesn't provide ability to read MIP SDK encrypted files.

In embodiments, the ILockBytes interface implementation may use MIP SDK which may be used with applications to store data using a structured storage device format. In embodiments, this allows for encrypting/decrypting files on the fly without the need to provide temporary files in the disk.

In embodiments, using an implement stream-based interface using MIP SDK for a flat file-based application may also provide an advantage.

In the embodiments set forth herein, hooking is used to extend functionality and to configure applications and file types for each application, for which no add-in support is possible.

In embodiments using DULS, decryption may be done using super user credentials incorporated into the DULS. In non-DULS embodiments, any user having proper permission to decrypt the file may provide authorization for encryption/decryption. In embodiments such as this, authentication may take place when a file is accessed and the session is valid for the entire process's lifetime.

In embodiments, the DULS may be used to pass encrypted and decrypted data via an operating system file, while in non-DULS embodiments, an in memory decryption encryption (IMDE) engine may be used as part of the shield dll and may use a third party library for any special functionality including encryption/decryption.

In embodiments, the non-DULS embodiment extends applications using either add-ins which are permitted by the application or hooking API's onto an enhanced function.

In the examples discussed herein, the method and system of the present disclosure are commonly discussed in the context of modifying an application to provide for encrypted files. It is noted that the method and system of the present disclosure may be used to provide other enhanced functionalities as well. For example, the method and system of the present disclosure may be used to provide for an automation process, useful for processing a large number of files for context. In embodiments, the method and system of the present application may be used to allow an application to extend the core of its own application. The method and system of the present application may allow customized interception in the application and document context when COM/scripting is not able to do so transparently. In embodiments, the method and system of the present application may also be used to limit access to the context of an application from injection by third party libraries, for example to support licensing severity.

In embodiments, the method and system of the present application may be used to provide a more user friendly experience when using certain operating systems. For example, the method and system of the present application may be utilized to bypass constraints that are common on some operating systems on assigning a default application for selected file types (file extensions) to provide a more user friendly experience. The method and system of the present application may be used to provide additional functionality of enhance existing functionality in any executable application.

Although the present invention has been described in relation to particular embodiments thereof, many other variations and modifications and other uses will become apparent to those skilled in the art. Steps and units described in relation to one aspect of the method or system may be added, or substituted, for steps or units described with respect to another aspect of the system. Combinations and permutations of steps different from those outlined are also contemplated. Steps outlined in sequence need not necessarily be performed in sequence, not all steps need necessarily be executed, and other intervening steps may be inserted. It is preferred, therefore, that the present invention be limited not by the specific disclosure herein.

A method of enhancing functionality of an executable application on a computer system where the computer system includes at least one processor and one or more storage elements, where the one or more storage elements include compiled computer executable code associated with a plurality of executable applications, the method including steps of: (a) storing, in the one or more memory storage elements, installation information including: (i) a list of a plurality of target applications; (ii) configuration information related to each target application of the plurality of target applications; (iii) user information related to a plurality of users of the computer system including user rights information; and (iv) desired user information associated with a plurality of desired user profiles including enhanced user rights information; (b) monitoring, by an administrator portion of the at least one processor, operation of the computer system to identify activation of at least one target application of the plurality of target applications by the at least one processor and a user associated with the activation; (c) initiating, by the administrator portion of the at least one processor, a desired user session based on the desired user information to access the at least one target application; (d) linking, by the administrator portion of the at least one processor, the at least one target application to an alternate library associated with the at least one target application via the desired user session and the enhanced user rights; (e) accessing, by the administrator portion of the at least one processor via the desired user sessions, a desired process from the alternate library and providing the desired process to the at least one target application; (f) processing, by the administrator portion of the at least one processor, at least one file based on the desired process to provide additional functionality not available without use of the desired process; wherein the processing includes at least one of opening and closing the at least one file; and (g) terminating, by the administrator portion of the at least one processor, the desired user session after processing such that operation of the target application is limited by the user rights of the user associated with activation.

The desired user session may be selected from a pool of desired used sessions active on the computer system.

The desired user session may be dynamically generated after activation of the at least one target application is identified.

The alternate library may be provided by a third party.

The alternate library may be uniquely associated with the at least one target application.

Prior to step (f) an authorizing step may be provided wherein the user associated with the activation is authorized to access the alternate library using the desired user section based on credential information associated with the user.

Step (c) may include initiating at least a second desired user session and step (d) may include linking, the at least one target application to the alternate library associated with the at least one target application via the second desired user session and second enhanced user rights to access a second desired process from the alternate library and providing the second desired process to the at least one target application such that the at least one file is processed based on the second desired process.

A system of enhancing functionality of an application in a computer system comprises: (a) at least one processor; and (b) one or more storage units operatively connected to the processor, wherein the one or more storage units include compiled computer executable code that is readable by the at least one processor to execute one or more executable applications using the computer system and computer executable code, wherein when executed by the at least one processor results in the processor performing the following steps: (i) storing, in the one or more memory storage elements, installation information including: (1) a list of a plurality of target applications; (2) configuration information related to each target application of the plurality of target applications; (3) user information related to a plurality of users of the computer system including user rights information; and (4) desired user information associated with a plurality of desired user profiles including enhanced user rights information; (ii) monitoring, by an administrator portion of the at least one processor, operation of the computer system to identify activation of at least one target application of the plurality of target applications by the at least one processor and a user associated with the activation; (iii) initiating, by the administrator portion of the at least one processor, a desired user session based on the desired user information to access the at least one target application; (iv) linking, by the administrator portion of the at least one processor, the at least one target application to an alternate library associated with the at least one target application via the desired user session and the enhanced user rights; (v) accessing, by the administrator portion of the at least one processor via the desired user sessions, a desired process from the alternate library and providing the desired process to the at least one target application; (vi) processing, by the administrator portion of the at least one processor, at least one file based on the desired process to provide additional functionality not available without use of the desired process; wherein the processing includes at least one of opening and closing the at least one file; (vii) terminating, by the administrator portion of the at least one processor, the desired user session after processing such that operation of the target application is limited by the user rights of the user associated with activation.

The desired user session may be selected from a pool of desired used sessions active on the computer system.

The desired used session may be dynamically generated after activation of the at least one target application is identified.

The alternate library may be provided by a third party.

The alternate library may be uniquely associated with the at least one target application.

Prior to step (b)(vi) an authorizing step may be provided wherein the user associated with the activation is authorized to access the alternate library using the desired user section based on credential information associated with the user.

Step (b)(iii) may include initiating at least a second desired user session and step (b)(iv) may includes linking, the at least one target application to the alternate library associated with the at least one target application via the second desired user session and second enhanced user rights to access a second desired process from the alternate library and providing the second desired process to the at least one target application such that the at least one file is processed based on the second desired process.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed:

1. A method of enhancing functionality of an executable application in a computer system, wherein the computer system includes at least one processor and one or more memory storage elements operatively connected to the at least one processor, the method comprising:
   (a) storing, in the one or more memory storage elements, installation information including:
      (i) a list of a plurality of target applications; and
      (ii) configuration information related to each target application of the plurality of target applications;
   (b) monitoring, by an administrator portion of the at least one processor, operation of the computer system to identify activation of at least one target application of the plurality of target applications by the at least one processor;
   (c) modifying, by the administrator portion of the at least one processor, at least one configuration file associated with the target application to load at least one alternate library associated with the target application;
   (d) initiating, by the administrator portion of the at least one processor, at least one application handler associated with the at least target application from the alternate library;
   (e) identifying, by the administrator portion of the at least one processor using the application handler, at least one application program interface associated with at least one enhanced function to be provided to the target application;
   (f) modifying, by the administrator portion of the at least one processor using the application handler utility, a call to the at least one application program interface to include an alternate address associated with a first modified application program interface;
   (g) calling, by the administrator portion of the at least one processor using the application handler, the first modified application program interface;
   (h) processing, by the at least one processor, the at least one file with the at least one target application using the modified application program interface to provide additional functionality not available without use of the modified application program interface;
      wherein the processing includes at least one of encrypting and decrypting data in the at least one file on the fly without using a temporary file; and
   (i) returning, by the administrator portion of the at least one processor using the application handler, operation of the target application to the at least one application program interface to provide for conventional functionality of the target application.

2. The method of claim 1, wherein the configuration information includes API information identifying at least one application program interface associated with each target application.

3. The method of claim 1, wherein the alternate library includes at least one modified application program interface associated with each target application.

4. The method of claim 1, wherein the alternate library includes at least a second modified application program interface associated with each target application, and the application handler calls the second modified application program interface associated with the at least one target application and the at least one file is processed based on the second modified application program interface.

5. The method of claim 1, wherein at least one of decrypting and encrypting data in the at least one file further comprises steps of:
   (1) determining that the data is one of encrypted and decrypted;
   (2) in the case where the data is one of encrypted and decrypted, determining that authorization is required to encrypt or decrypt the data;
   (3) authorizing at least one user based on identification information associated with the user,
   (4) after authorizing the user, encrypting or decrypting the data in the at least one file;
   (5) storing the at least one file.

6. The method of claim 5, wherein, in the case where the data is not encrypted or decrypted, the method proceeds to step (i).

7. The method of claim 1, wherein step (e) includes identifying more than one application program interface associated with the target application and step (f) includes modifying calls to the more than one application program interfaces.

8. The method of claim 7, wherein step (g) includes calling the more than one modified application program interfaces and step (h) includes processing the at least one file based on the more than one modified application program interfaces.

9. A system of enhancing functionality of an application in a computer system comprises:
   (a) at least one processor; and
   (b) one or more storage units operatively connected to the processor, wherein the one or more storage units include compiled computer executable code that is readable by the at least one processor to execute one or more executable applications using the computer system and computer executable code, wherein when executed by the at least one processor results in the at least one processor performing the steps of:
      (i) storing, in the one or more memory storage elements, installation information including:
         (1) a list of a plurality of target applications; and
         (2) configuration information related to each target application of the plurality of target applications;
      (ii) monitoring, by an administrator portion of the at least one processor, operation of the computer system to identify activation of at least one target application of the plurality of target applications by the at least one processor;
      (iii) modifying, by the administrator portion of the at least one processor, at least one configuration file associated with the target application to load at least one alternate library associated with the target application;
      (iv) initiating, by the administrator portion of the at least one processor, at least one application handler associated with the at least one target application from the alternate library;
      (v) identifying, by the administrator portion of the at least one processor using the application handler, at least one application program interface associated with the at least one enhanced function to be provided to the target application;
      (vi) modifying, by the administrator portion of the at least one processor using the application handler utility, a call to the at least one application program interface to include an alternate address associated with a first modified application program interface;

(vii) calling, by the administrator portion of the at least one processor using the application handler, the first modified application program interface using the alternate address;

(viii) processing, by the administrator portion of the at least one processor, at least one file based on the modified application program interface to provide additional functionality not available without use of the modified application program interface;

wherein the processing includes at least one or encrypting and decrypting data in the at least one file on the fly without using a temporary file;

(ix) returning, by the administrator portion of the at least one processor using the application handler, operation of the target application to the at least one application program interface to provide for conventional functionality of the target application.

10. The system of claim 9, wherein the configuration information includes API information identifying at least one application program interface associated with each target application.

11. The system of claim 9, wherein the modified library includes at least one modified application program interface associated with each target application.

12. The system of claim 9, wherein the modified library includes at least a second modified application program interface associated with each target application, and the application handler calls the second modified application program interface associated with the at least one target application and the at least one file is processed based on the second modified application program interface.

13. The system of claim 9, wherein at least one of decrypting and encrypting data in the at least one file further comprises steps of:

(1) determining that the data is one of encrypted and decrypted;

(2) in the case where the data is one of encrypted and decrypted, further comprising, determining that authorization is required to encrypt or decrypt the data;

(3) authorizing at least one user based on identification information associated with the user;

(4) after authorizing the user, encrypting or decrypting the data in the at least one file;

(5) storing the at least one file.

14. The system of claim 13, wherein, in the case where the data is not encrypted or decrypted, the method proceeds to step (b)(ix).

15. The system of claim 9, wherein step (b)(v) includes identifying more than one application program interface associated with the target application and step (b)(vi) includes modifying calls to the more than one application program interfaces.

16. The system of claim 15, wherein step (b)(vii) includes calling the more than one modified application program interfaces and step (b)(viii) includes processing the at least one file based on the more than one modified application program interfaces.

* * * * *